United States Patent [19]
Williamson

[11] 3,961,018
[45] June 1, 1976

[54] METHOD FOR PURIFICATION OF GAS STREAMS BY REMOVAL OF ACIDIC GASES

[75] Inventor: Walter H. Williamson, Cincinnati, Ohio

[73] Assignee: United Air Specialists, Inc., Cincinnati, Ohio

[22] Filed: Dec. 6, 1973

[21] Appl. No.: 422,210

[52] U.S. Cl. ................................ 423/228; 423/229; 423/235; 423/240; 423/241; 423/242; 423/243; 423/245
[51] Int. Cl.² ........................................ C01B 17/16
[58] Field of Search .......... 423/228, 229, 235, 240, 423/241, 243, 245, 242; 23/260, 283, 284; 55/233; 261/98; 204/210

[56] References Cited
UNITED STATES PATENTS

| | | | |
|---|---|---|---|
| 2,818,323 | 12/1957 | Haensel | 423/228 |
| 3,006,436 | 10/1961 | Starbuck et al. | 261/95 |
| 3,084,024 | 4/1963 | Hamilton et al. | 423/210 |
| 3,268,296 | 8/1966 | Hall et al. | 55/233 |
| 3,475,133 | 10/1969 | Muller-Wartenberg | 261/98 |
| 3,522,692 | 8/1970 | Brookman et al. | 261/98 |
| 3,574,562 | 11/1968 | Kawahata | 23/284 |
| 3,615,199 | 10/1971 | Terrana | 55/233 |
| 3,658,462 | 4/1972 | Van Scoy | 423/228 |
| 3,771,289 | 11/1973 | Skoli et al. | 55/233 |
| 3,773,897 | 11/1973 | Fields et al. | 423/235 |

OTHER PUBLICATIONS
Chem–Ing–Tech 1972, 44(5), pp. 332–337 (German).

*Primary Examiner*—Earl C. Thomas
*Assistant Examiner*—Wayne A. Langel
*Attorney, Agent, or Firm*—Melville, Strasser, Foster & Hoffman

[57] ABSTRACT

A method and apparatus for removal of acidic gases from a gas stream by contacting the gas stream with an amine vapor in a reaction zone. The partial pressure of amine vapor in the reaction zone is at least 5 percent of the total pressure therein, resulting in removal of at least 99 percent of the acidic gases. When operating at ambient temperature and substantially atmospheric pressure, preferred amines are methylamine and dimethylamine.

11 Claims, 1 Drawing Figure

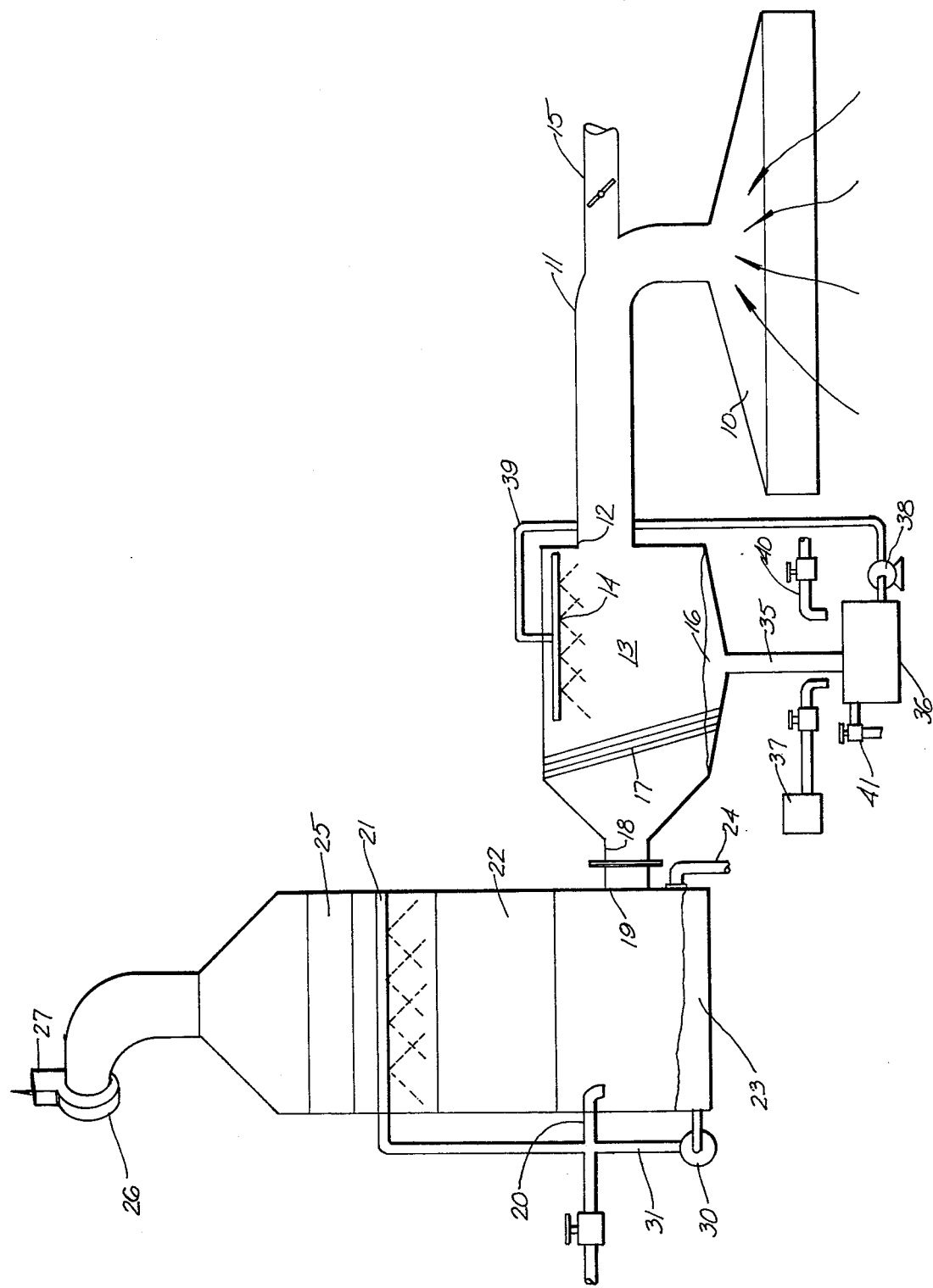

METHOD FOR PURIFICATION OF GAS STREAMS BY REMOVAL OF ACIDIC GASES

BACKGROUND OF THE INVENTION

1. Field of the Invention

This invention relates to the purification of gas streams by removal therefrom of acidic gases, such as nitrogen oxides, carbon dioxide, hydrogen sulfide, sulfur dioxide, halogen gases, halogen acid gases, organic acid gases such as formic acid, acetic acid and the like, by means of vapor phase reaction between the acidic gases and an amine, followed by separation of the reaction products from the gas streams. The process and apparatus of the invention have particular utility in removal of oxides of nitrogen from chemical process tail gases, combustion products of gas, coal and oil fired power generators and the like, exhaust gases of metal pickling operations, and from other gaseous emissions wherein the problem of nitrogen oxide pollution is present.

2. Description of the Prior Art

Increasingly stringent requirements for removal of pollutants from gases discharged to atmosphere have made obsolete many conventional systems and processes for purification of exhaust gases from industrial process which were effective in removing up to about 98% of the pollutants. In the removal of acidic gases it has long been customary to contact a gas stream with alkaline scrubbing solutions containing ammonia, amines, urea, alkali metal hydroxides, and/or alkaline salts. Representative patents disclosing processes of this type include U.S. Pat. Nos. 2,608,462; 2,613,132; 2,638,405; 2,889,197; 2,955,909; 3,161,461; 3,329,478; 3,463,603; 3,502,428; 3,635,657; 3,653,809 and 3,653,810.

Removal of acidic gases from a gas stream by passage through a zeolite molecular sieve or a fluidized bed of an absorptive solid impregnated with a high boiling point amine is disclosed in U.S. Pat. Nos. 2,818,323 and 3,508,382.

Catalytic conversion of nitrogen oxide gases is disclosed in U.S. Pat. Nos. 3,425,893 and 3,567,367.

The efficient removal (i.e. at least 99 percent efficiency) of nitrogen oxides has proven to be more difficult than removal of other acidic gases such as carbon dioxide, hydrogen sulfide, and sulfur dioxide. Considerable attention has recently been directed to this problem, and reference may be made to the following articles in the *Journal Of The Air Pollution Control Association:*

Volume 19, No. 10, October 1969, pages 791–794
Volume 20, No. 5, May 1970, pages 303–306
Volume 21, No. 3, March 1971, pages 122–127
Volume 22, No. 6, June 1972, pages 471–472

Recent *Chemical Abstracts* references relating to control of nitrogen oxide emissions include the following:

Volume 74, No. 4, Jan. 25, 1971, 15556n
Volume 74, No. 24, June 14, 1971, 140021w
Volume 76, No. 14, Apr. 3, 1972, 76090u
Volume 77, No. 22, Nov. 27, 1972, 143502r
Volume 78, No. 4, Jan. 29, 1973, 19849r
Volume 78, No. 6, Feb. 12, 1973, 33476y
Volume 78, No. 10, Mar. 12, 1973, 61806z
Volume 78, No. 18, May 7, 1973

The above-mentioned article in *Journal Of The Air Pollution Control Association*, Vol. 21, No. 3, March 1971, pages 122–127, discusses the rate of conversion of NO to $NO_2$, points out that the rate is much slower at low concentrations, that the solubility rate of $NO_2$ in water or alkaline solutions is much slower at low concentrations, and concludes that reduction of stack gas concentrations of nitrogen oxides below about 200 ppm in liquid absorption equipment of practical dimensions is impractical.

In stationary power generating equipment utilizing fossil fuel it appears from the above literature sources that emphasis has shifted to changes in design and combustion techniques rather than reliance on absorption equipment, in order to reduce nitrogen oxide emissions.

The use of ammonia in accordance with prior art disclosures, either in aqueous solution or in the presence of a solid catalyst, for the reduction of oxides of nitrogen, inherently involves some reaction in the vapor phase because of the volatility of ammonia gas. However, the exothermic reaction of ammonia with oxides of nitrogen is of an entirely different type than that of amines with nitrogen oxides. According to *Air Pollution Control* — Part I, Wiley Interscience Series of Texts and Monographs, (1971) pages 80–88, catalytic reduction of nitrogen oxides by ammonia produces a gas stream vented to atmosphere containing 80 ppm of oxides of nitrogen and 10 ppm of ammonia. It is therefore apparent that ammonia cannot achieve substantially complete removal of nitrogen oxides in a reactor of practical size.

At the present time the consensus of workers skilled in the art is that known methods of removing nitrogen oxides from gas streams by absorption in solutions or by solids are not effective in meeting recent requirements in air pollution control. Catalytic reduction of nitrogen oxides is considered to be commercially feasible, but it is well known that such catalysts are expensive, subject to poisoning by other pollutants which may be present in the gas stream being cleaned, and require precise control and maintenance.

It is therefore apparent that there is a definite need for a simple, efficient and reliable method and apparatus for removing acidic gases from gas streams before discharge thereof to atmosphere.

SUMMARY

It is a principal object of the present invention to provide a process and apparatus which will solve the problem of simple, economical and reliable removal of acidic gases substantially completely from gas streams.

In the practice of this invention the above object is achieved by contacting the gas stream containing acidic gases with an amine vapor in a reaction zone, the partial pressure of amine vapor present in the zone being sufficient to constitute at least 5 percent of the total pressure within the zone, mixing the gas stream and the amine vapor so as to effect a vapor phase reaction between the amine and acidic gases, optionally effecting in addition a liquid phase reaction between the amine and acidic gases, separating the reaction products from the gas stream, and discharging the purified gas stream to atmosphere.

Apparatus for carrying out the method of the invention may be of conventional construction except for the provision of a reaction chamber wherein the entering gas stream is contacted with amine vapor to initiate the vapor phase reaction. This is followed by contacting the gas stream in a conventional scrubber with an aqueous spray and/or with an aqueous spray of an amine solution under conditions which may effect both vapor phase and liquid phase reactions.

To the best of applicants' knowledge, vapor phase reaction of amines with acidic gases has never previously been suggested, and the amines utilized in the prior art have been of such low volatility that solutions thereof would not inherently produce in the reaction zone a partial vapor pressure of the amine amounting to at least 5 percent of the total pressure within the zone.

It has been found that reaction in the vapor phase proceeds more rapidly and to a higher degree of completion than reaction in the liquid phase thereby making possible removal of at least 99 percent of the acidic gases, i.e. to a level of less than 10 ppm, in a reactor of practical size.

BRIEF DESCRIPTION OF THE DRAWING

Reference is made to the accompanying drawing wherein the sole FIGURE is a diagrammatic illustration of a complete system for treatment of an acidic gas-containing waste gas stream from an industrial operation, including a vertical sectional view of a vapor phase reaction zone, scrubber chamber and mist eliminator embodying the invention.

DESCRIPTION OF THE PREFERRED EMBODIMENTS

In carrying out the method of the invention, the gas stream to be cleaned ordinarily is at ambient temperature, i.e. within the range of about 10° to about 40° C, and also ordinarily contains some water vapor and oxygen in addition to the acidic gases which are to be removed therefrom. The prior art has indicated that the presence of NO renders purification of such gases more difficult because of the lower solubility and reactivity of NO. Therefore, it is preferred that sufficient oxygen be present in the gas stream to cause substantial conversion of NO to $NO_2$. As is well known, at ambient temperatures and in the presence of sufficient oxygen, the equilibrium for the reaction

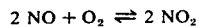

shifts toward the right, so that the great preponderance of nitrogen oxides is in the form of $NO_2$ under these conditions. It will thus be understood that in the preferred practice, if the gas stream to be purified is at high temperature and contains very little oxygen, means will be provided to introduce air into the gas stream or into the vapor phase reaction chamber, thus simultaneously reducing the temperature of the gas stream and introducing sufficient oxygen into the system to insure conversion of most of the NO to $NO_2$.

When operating at ambient temperatures, it has been found that an amine having a boiling point no higher than about 70°C, and preferably no higher than about 50°C, has sufficient volatility when introduced into the reaction zone, in vaporized or liquid form, or in the form of a spray of an aqueous amine solution, to produce a partial vapor pressure of the amine of at least 5 percent of the total pressure within the reaction zone. In this connection, it will be recognized that the system of the invention is designed for continuous operation at atmospheric pressure, or slightly sub-atmoshperic pressure by reason of the suction of an exhaust fan. The amine vapor, amine solution and supplementary air will be introduced at slightly above atmospheric pressure, and the term "substantially atmospheric pressure" used herein is intended to include atmospheric pressure, the slightly sub-atmospheric pressure created by the suction of the exhaust fan and the slightly super-atmoshperic pressure used to introduce the amine and supplementary air into the system.

Referring to the drawing, an exhaust hood is indicated at 10 which collects waste or tail gases from a typical industrial operation such as chemical processing, metal pickling, combustion products and the like. This gas stream, containing acidic gases, is conducted through a duct indicated at 11 to inlet 12 of a reaction zone indicated generally at 13. The duct is provided with a regulated inlet for supplementary air indicated at 15.

Reaction zone 13 is a vapor phase reaction chamber having means such as spray nozzles 14 for introducing an amine. This can conveniently be introduced through inlet 14 in the form of amine vapor, a spray of liquid amine, or an aqueous solution thereof, and the amine will be so selected that its volatility and vapor pressure at the temperature existing in the reaction zone will insure that the amine is present in vapor form in chamber 13. As indicated previously, the amine is introduced at slightly greater than atmospheric pressure.

Chamber 13 is provided with a base region 16 arranged to collect residual liquid amine or amine solution for recirculation through the reaction chamber. Mist eliminator means 17, in the form of baffles or packing, located near reaction chamber outlet 18, reduces carryover of the liquid amine, or amine solution, from the reaction zone. The reaction products of the amine and the acidic gases are drawn through the mist eliminator 17 and out of the reaction chamber through outlet duct 18 and introduced into inlet 19 of a scrubber section, comprising a scrubber liquid inlet 20, scrubber spray nozzles 21 and a scrubber bed 22 which may be packed with Raschig rings.

The withdrawal, separation and scrubbing of the reaction products and the apparatus therefor are of conventional nature and hence need not be described in detail. Reference may be made to U.S. Pat. No. 3,006,436 for such details.

A drain indicated at 35 is provided for draining amine or amine solution collected in the reaction chamber base region or sump 16, into a recirculation tank 36. Amine may be introduced from a feed tank 37 into the recirculation tank. A recirculating pump, indicated at 38, is provided for continuous supply of the amine through conduit 39 to the reaction chamber 13 via nozzle means 14. In the exemplary embodiment illustrated in the drawing, the feed tank 37 is adapted to introduce concentrated amine solution into the recirculation tank 36 for dilution and introduction into the reaction chamber 13 in spray form, a water inlet to tank 36 being indicated at 40.

It should be understood that an amine solution can be introduced into the conventional scrubber section at the scrubber liquid inlet 20 and/or through spray nozzles 21. The same amine can be introduced into both the reaction chamber and the scrubber section at the same or different concentrations, or different amines could be introduced into the reaction chamber and the scrubber section by appropriate duplication of feed tanks, pumps and conduits to achieve additional contact of the amine with the acidic gases, thereby establishing a zone in bed 22, and/or above and beneath the bed, where both vapor and liquid phase reactions occur. The amine-acid gas reaction products, being water soluble, are removed in the scrubber bed 22, and carried downwardly into a scrubber sump 23 by the scrubber liquid. These reaction products are withdrawn from the sump through a drain line indicated at 24.

The cleaned gas stream is conducted through a scrubber demister 25 by the suction of an exhaust fan 26 and vented to atmosphere through a stack indicated at 27. A cyclonic separator (not shown) may be provided if desired.

Recirculation of scrubber liquid from sump 23 back to spray nozzles 21 may also be provided, a recirculation pump 30 and conduit 31 being shown for this purpose.

It should further be understood that supplementary air could be introduced into the exhaust hood 10, rather than through inlet 15, to provide additional time for conversion of NO to $NO_2$, or into reaction chamber 13.

As indicated above, when cleaning a gas stream at ambient temperature, it is preferred to utilize an amine having a boiling point no higher than about 50°C. A number of aliphatic primary, secondary or tertiary amines meet this requirement, and information regarding these amines is summarized in Table I below.

TABLE I

| Name | Formula | Boiling Pt. °C | Molecular Weight |
|---|---|---|---|
| methylamine | $CH_3NH_2$ | −6.5 | 31.06 |
| dimethylamine | $(CH_3)_2 NH$ | 7.4 | 45.08 |
| trimethylamine | $(CH_3)_3 N$ | 3.5 | 59.11 |
| ethylamine | $C_2H_5NH_2$ | 16.6 | 45.08 |
| diethylamine | $(C_2H_5)_2 NH$ | 55.5 | 73.14 |
| i-propylamine | $(CH_3)_2 CHNH_2$ | 33 | 59.11 |
| n-propylamine | $CH_3(CH)_2 NH_2$ | 49 | 59.11 |
| t-butylamine | $(CH_3)_3 CNH_2$ | 45.2 | 73.14 |

In a series of laboratory-scale tests wherein nitrogen oxide-containing gas streams at room temperature were subjected to the scrubbing action of a number of the amines in Table I, as well as certain other materials commonly used in the prior art, it was found that the amines as a class excelled in removal of nitrogen oxides. These tests were conducted in a vapor phase reaction chamber by spraying into the chamber a 5 percent by weight aqueous solution of the scrubbing compound.

A scale was established, based on the effectiveness of water as a base unit, and the laboratory-scale tests described above showed that the following approximate relationship exists with all tests being conducted under the same conditions:

TABLE II

| Name | Type of Compound | Relative Efficiency Equal Weight Basis |
|---|---|---|
| Water | Neutral | 1 |
| Urea (Carbamide) | Amide | 5 |
| Ammonia | Alkaline Gas | 15 |
| Triethanolamine | Alkanolamine | 11 |
| Methylamine | Primary Amine | 55 |
| Dimethylamine | Secondary Amine | 35 |
| Trimethylamine | Tertiary Amine | 18 |
| i-Propylamine | Primary Amine | 16 |
| t-butylamine | Primary Amine | 20 |

The data of Table II show that all the amines tested were superior in effectiveness for the removal of nitrogen oxides, with methylamine and dimethylamine the more preferred members of the amines in the removal of nitrogen oxides. This is attributable to two factors, viz. the low boiling point (and consequent high vapor pressure) of methyl- and dimethylamine, and their low molecular weight which provides a higher stoichiometric equivalence for the same absolute weight. In other words, one gram of methylamine provides a greater number of amino groups than one gram, e.g., of t-butylamine. A comparison of these relative efficiencies, together with the data from Table I, indicates that effectiveness is not solely a function of boiling point and/or molecular weight.

For example, trimethylamine, having a boiling point of 3.5°C and a molecular weight of 59.11, exhibited substantially the same effectiveness as i-propylamine (having a boiling point of 33°C and a molecular weight of 59.11) and t-butylamine (having a boiling point of 45.2°C and a molecular weight of 73.14). Since trimethylamine is a tertiary amine whereas i-propylamine and t-butylamine are primary amines, it appears that tertiary amines are less effective than primary amines. On the other hand, the secondary amine dimethylamine exhibited high relative efficiency, and hence both primary and secondary aliphatic amines can be relied upon to produce optimum efficiency. Although not wishing to be bound by theory, it is believed that the vapor phase reaction with nitrogen oxides may be somewhat analogous to the reactions of an aliphatic amine with nitrous acid. It is well-known that primary aliphatic amines are converted by nitrous acid into alcohols with evolution of nitrogen, that secondary aliphatic amines yield nitrosamines, while tertiary amines undergo no reaction at the amino group.

According to theory, therefore, vapor phase reaction of primary and secondary amines with nitrogen oxides results in at least partial conversion of the nitrogn oxides to nitrogen and to nitrosamines, with the remainder converted to reaction products of presently unidentified types. Low boiling point tertiary amines undergo a type of reaction in the vapor phase which is at present unknown, but which is more effective in removal of nitrogen oxides than triethanolamine and urea.

Translating the relative efficiencies set forth above into terms of completeness of removal of nitrogen oxides from a gas stream, the preferred members methylamine and dimethylamine would remove at least 99 percent of the nitrogen oxides at room temperature in a reaction zone or chamber of practical dimensions. None of the other compounds listed above would achieve 99 percent removal at room temperature unless reaction time or the size of the reaction chamber were substantially increased. However, a higher temperature within the reaction zone, e.g. 40°–50°C, would increase the effectiveness of compounds such as i-propylamine and t-butylamine.

Similar laboratory-scale tests were conducted wherein sulfur dioxide-containing gas streams were subjected to the scrubbing action of several of the amines and other materials listed in Table II. These tests showed approximately the same effectiveness by amines in the removal of sulfur dioxide in a vapor phase reaction. Other acidic gases of the type set forth above which undergo analogous vapor phase reactions would apparently be removed in an equally effective manner by the amines.

While the concentration of amine vapor in the reaction zone should be varied depending upon the concentration of acidic gases in the gas stream to be cleaned, it has been found that amine vapor in an amount sufficient to produce an amine partial vapor pressure of at least 5 percent of the total pressure in the reaction zone is sufficient to reduce nitrogen oxide concentrations up to about 1000 ppm at the inlet to less than 10 ppm at the outlet from the reaction zone. This can be achieved by introducing the amine into the vapor phase reaction chamber and the scrubber chamber of the above-described apparatus in the form of an aqueous solution containing from about 1 percent by weight to saturation of the amine. Preferably the solution contains at least 5 percent by weight of the amine.

Calculations of the rate of introduction of amine vapor for continuous operation have been made based on $NO_2$ concentrations ranging from 50 to 1000 ppm for the more preferred methylamine, and for trimethylamine, one of the less efficient members of the group. It was found that one part by weight of $NO_2$ was removed by about 0.674 part by weight of methylamine, while one part by weight of $NO_2$ was removed by about 1.283 parts by weight of trimethylamine. The amounts required in $mg/m^3$ of each amine for removal of varying concentrations of $NO_2$ is set forth in Table III below. It will be noted that a minimum of about 32 mg methylamine would suffice to remove 50 ppm of $NO_2$ per cubic meter, while a maximum of about 1210 mg trimethylamine would be required to remove 1000 ppm of $NO_2$ per cubic meter. This is equivalent to a minimum of about 0.001 mols per cubic meter of methylamine and a maximum of about 0.02 mols per cubic meter of trimethylamine.

TABLE

| $NO_2$ Concentration ppm | $mg/m^3$ | Amount of Amine Required-$mg/m^3$ methylamine | trimethylamine |
| --- | --- | --- | --- |
| 50 | 47 | 31.7 | 60.3 |
| 100 | 94 | 63.4 | 120.9 |
| 200 | 188 | 126.8 | 241.8 |
| 500 | 470 | 317 | 603 |
| 1000 | 940 | 634 | 1209 |

While it has been indicated above that the preferred process of the invention is conducted at ambient temperature and at substantially atmospheric pressure, it is within the scope of the invention to purify gas streams at elevated temperatures and/or super-atmospheric pressures. When operating under such conditions an amine would be selected having a boiling point such that it would provide a partial vapor pressure of the amine of at least 5 percent of the total pressure in the reaction zone, thereby insuring a vapor phase reaction between the amine vapor and the acidic gases. The invention thus provides a highly versatile process which may be conducted under a wide variety of conditions.

Moreover, while the preferred apparatus of the invention has been disclosed as including reaction and scrubber chambers and as incorporating both vapor phase and liquid phase reactions, it is within the scope of the invention to contact the gas stream with amine vapor in a single reaction chamber in which only a substantially vapor phase reaction occurs, followed by conventional water scrubbing.

In summary, amines which may be used in the practice of the invention include any water-soluble primary, secondary and tertiary aliphatic and aralkyl amines having a vapor pressure high enough to produce a partial pressure of amine vapor constituting at least 5 percent of the total pressure within the reaction zone under any temperature and pressure conditions existing in said zone. When the reaction zone is at ambient temperature, it is preferred to use amines having a boiling point not higher than about 50°C, and more preferably not higher than about 20°C. Under such conditions optimum results have been obtained with aliphatic primary and secondary amines, or mixtures thereof, having boiling points not higher than about 10°C (e.g. methylamine, dimethylamine, and mixtures thereof).

Other modifications and variations may be made in the embodiments hereinbefore set forth without departing from the scope of the invention, and it will be understood that the invention is not limited, except as defined in the appended claims.

The embodiments of the invention in which an exclusive property or privelege is claimed are defined as follows:

1. A continuous process of removing acidic gases chosen from the group consisting of nitrogen oxides, carbon dioxide, hydrogen sulfide, sulfur dioxide, halogen gases, formic acid gases, acetic acid gases, and mixtures thereof, from a moving gas stream which comprises passing said gas stream into a reaction zone, continuously introducing a vapor of a water-soluble amine chosen from the group consisting of primary, secondary and tertiary aliphatic and aralkyl amines, and mixtures thereof, into said zone at a rate sufficient to produce a partial pressure of at least 5 percent of the total pressure within said zone, commingling said gas stream and said amine vapor whereby to effect a vapor phase reaction of said amine vapor with said acidic gases, scrubbing said gas stream with an aqueous liquid whereby to separate reaction products of said amine and acidic gases from said gas stream, and discharging said gas stream to atmosphere.

2. The process of claim 1, wherein said gas stream is at ambient temperatures, and wherein said amine has a boiling point no higher than about 50°C.

3. The process of claim 2, wherein said acidic gases comprise oxides of nitrogen and wherein said amine is sprayed into said reaction zone in the form of an aqueous spray in an amount which is in direct proportion to the concentration of said oxides of nitrogen in said gas stream and at a rate sufficient to provide from about 0.001 mol to about 0.02 mol of amine vapor per cubic meter of said gas stream for concentrations ranging from about 50 to about 1000 ppm of said oxides of nitrogen.

4. The process of claim 3, wherein said amine is methylamine.

5. The process of claim 3, wherein said amine is dimethylamine.

6. The process of claim 1, wherein said gas stream additionally contains oxygen.

7. The process of claim 1, wherein said amine is sprayed into said reaction zone in the form of an aqueous solution containing at least 1 percent by weight of said amine.

8. The process of claim 1, wherein said step of scrubbing said gas stream with an aqueous liquid comprises scrubbing said gas stream with an aqueous solution of said amine whereby to effect a liquid phase reaction of said amine with said acidic gases.

9. A continuous process for purifying a moving gas stream by removal of acidic gases therefrom chosen from the group consisting of nitrogen oxides, carbon dioxide, hydrogen sulfide, sulfur dioxide, halogen gases, formic acid gases, acetic acid gases, and mixtures thereof, which comprises passing said gas stream into a reaction zone, continuously admitting a vapor of an amine chosen from the group consisting of water-soluble primary, secondary, and tertiary aliphatic and aralkyl amines, and mixtures thereof, into said zone in an amount sufficient to produce a partial vapor pressure of said amine of at least 5 percent of the total pressure within said reaction zone, commingling said gas stream and said amine vapor whereby to effect a vapor phase reaction of said amine vapor with said acidic gases, separating the reaction products of said amine vapor and acidic gases from said gas stream and discharging the so-purified gas stream to atmosphere.

10. The process of claim 1, wherein said amine has a boiling point no higher than about 50°C when said gas stream is at ambient temperature.

11. The process of claim 1, wherein said gas stream additionally contains oxygen.

* * * * *